United States Patent [19]
Taylor et al.

[11] 4,058,079
[45] Nov. 15, 1977

[54] MOVEMENT INDICATOR

[76] Inventors: Michael J. Taylor, 293 Shasta Drive, Pittsburgh, Pa. 15239; John P. Isley, 1901 Fern Hill Drive, Valparaiso, Ind. 46383

[21] Appl. No.: 694,526

[22] Filed: June 10, 1976

[51] Int. Cl.² .......................... E21D 21/02; G01V 1/28
[52] U.S. Cl. .................................. 116/114 H; 33/1 H; 116/124 R
[58] Field of Search ................... 116/124 R, DIG. 34, 116/114 AH, 124 D, 114 AH; 73/88 E, 88 R; 33/125 B, 1 H

[56] References Cited
U.S. PATENT DOCUMENTS

| | | | |
|---|---|---|---|
| 1,018,328 | 2/1912 | Lee et al. | 116/DIG. 34 |
| 2,692,924 | 10/1954 | Williams | 116/DIG. 34 |
| 3,082,733 | 3/1963 | Tamny | 116/DIG. 34 |
| 3,460,258 | 2/1972 | Geary et al. | 33/1 H |
| 3,786,503 | 1/1974 | Webb et al. | 33/1 H |

Primary Examiner—Daniel M. Yasich
Attorney, Agent, or Firm—Parmelee, Miller, Welsh & Kratz

[57] ABSTRACT

In a device for indicating a preset amount of relative movement between two points, an indicator sleeve axially movable in a cylindrical bore in a housing fixed to one of the points remains flush with the housing until the preset amount of movement is reached at which point the sleeve pops up to give a positive, easily identifiable indication of the movement. An actuating rod which bears against and follows the second point is axially slidable in the sleeve and operates a ball bearing mechanism which locks the indicator sleeve in the retracted position. The amount of movement required to generate the discrete indication is easily variable and monitoring of the actual displacement is always available.

10 Claims, 15 Drawing Figures

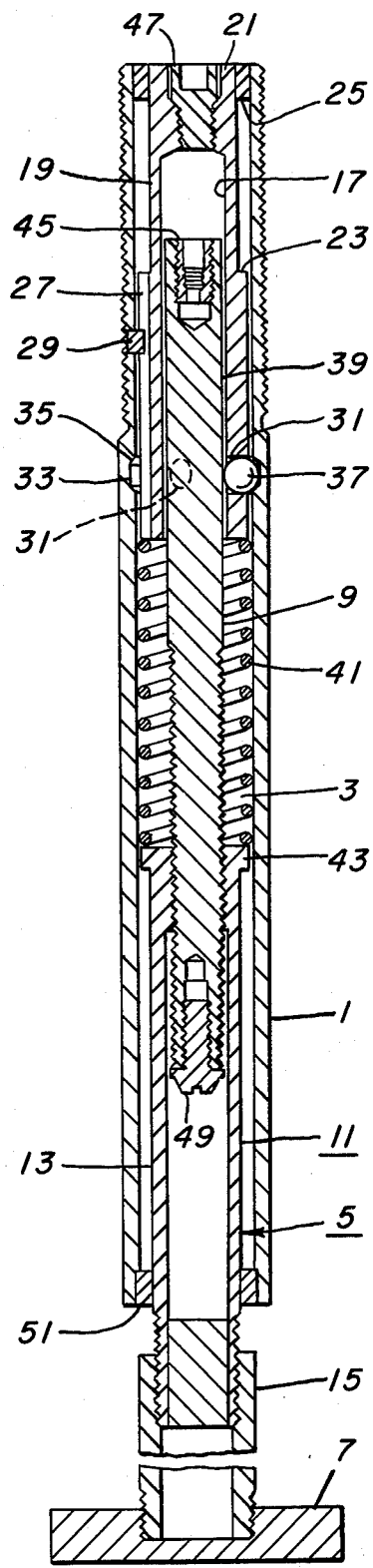
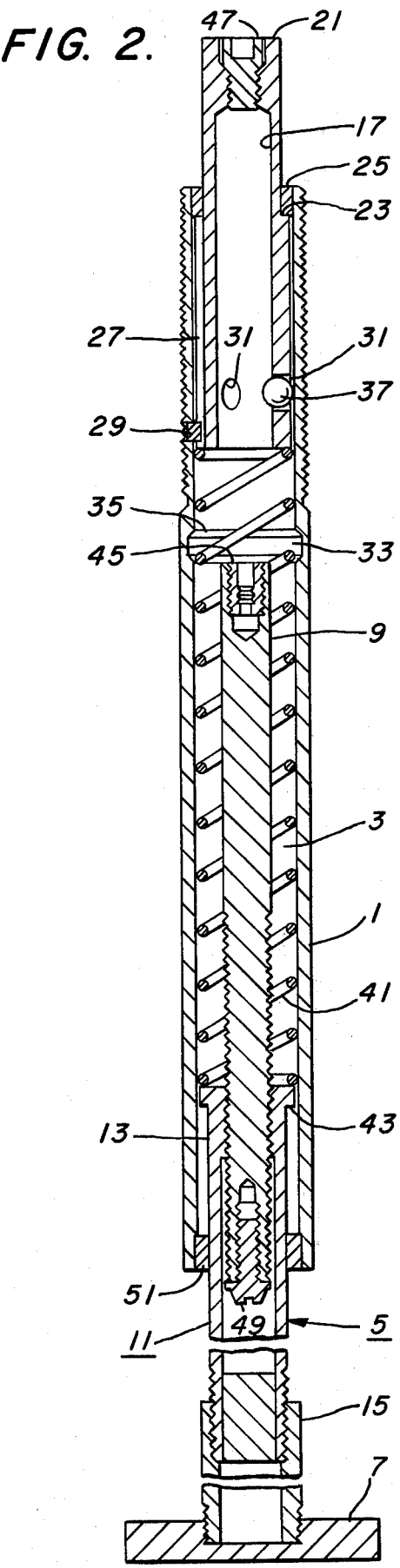

MOVEMENT INDICATOR

BACKGROUND OF THE INVENTION

1. Field of the Invention

This invention relates to devices which indicate the amount of relative movement between two points in various engineering, construction and mining applications and more particularly to such a device which gives a positive, dramatic indication of easily selectable amounts of such movement.

2. Prior Art

There are many applications in the engineering, construction and mining fields where it is desirable to be able to detect and measure relative movement between two points, such as the shifting of earth and rock formations, the sagging of mine roofs and the heaving in tunnels and deep excavations. Various devices have been proposed for these purposes. In U.S. Pat. No. 3,404,460, a rod anchored in a bore hole in the rock formation actuates a deflection type gauge or a potentiometer connected in an electrical indicating circuit to provide an indication of the internal movements in rock formations. In U.S. Pat. No. 3,416,320, a shaft connected to one anchor bolt secured deep in a bore in the wall of a tunnel or mine is freely slidable through another anchor bolt secured near the entrance of the bore. A plunger type gauge actuated by the rod measures the relaxation of the rock or earth formation. Also, in U.S. Pat. No. 3,460,258, a rod string anchored within an earth formation provides an indication of movement of the formation relative to a reference bushing adjustably positioned in a casing surrounding the upper end of the rod string. All of these above devices provide an analog indication of shifting of the earth or rock formation which requires careful reading to detect gradual shifting of the formation.

In U.S. Pat. No. 3,646,553, a housing containing a microswitch is biased against a mine roof by a spring which is restrained by a bracket clamped to the end of a cable or rod anchored in a bore in the mine roof. Displacement of the roof actuates a microswitch which completes a warning circuit. While this device provides a discrete warning of a preset displacement of a mine roof, it requires electric power supplied by batteries which require periodic charging or replacement. Like the other devices discussed above, it also requires an anchor which makes it more difficult to transfer the device from one position to another and is not adaptable to some applications. For instance, in spanning type foundations it is desirable to monitor the soil beneath the foundation for settlement. The above-mentioned devices are not suitable for this purpose.

A device has also been suggested in which a rod biased to follow one point pulls a plug out of a housing secured to the second point when the two points have opened a preset amount. However, such a device only indicates opening movement and when placed in a floor to detect settlement under a spanning type foundation, the plug can be accidently kicked out. Furthermore, it does not give as dramatic and easily recognizable indication of a preset amount of movement as is desirable.

It is a primary object of the present invention to provide a movement indicator which presents a discrete, easily readable mechanical indication of a predetermined amount of movement between two points.

It is another object of the invention to provide such a device in which the amount of movement required to actuate the discrete mechanical indication is readily selectable with the device in place.

It is also an object of the invention to provide such a device which offers a continuous analog presentation of the amount of movement in addition to the discrete indication of a preset shift.

It is a further object of the invention to provide a device as described above which can be adapted to provide an indication of either converging or diverging movement between two points.

It is yet another object of the invention to provide a device such as described above which can be used with or without anchors.

It is still another object of the invention to provide a device such as described above which can be easily removed and replaced after the void left by settlement has been filled with grout introduced through the opening accommodating the movement indicator.

It is finally an object of the invention to provide a device as described in the previous objects which is rugged, reliable and inexpensive to construct.

SUMMARY OF THE INVENTION

According to the invention, a device for detecting a predetermined discrete movement between two displaced points comprises a housing having a cylindrical bore therethrough secured to one point, an elongated actuating rod having a first end bearing against the second point with the second end slidably inserted into a first end of the bore in the housing, an indicator sleeve inserted into the second end of the bore in the housing and axially slidable between a retracted position within the housing an an extended position wherein a portion of the sleeve extends beyond the second end of the housing, biasing means for biasing the indicator sleeve to the extended position, and locking means associated with the actuating rod for securing the indicator sleeve in the retracted position in the housing against the urging of the biasing means until the actuating rod moves a predetermined distance inside the housing in response to a corresponding change in the distance between the first and second points to release the indicator sleeve and permit the biasing means to urge the sleeve to the extended position thus presenting a discrete mechanical indication of the predetermined change in distance between the first and second points.

Preferably, the housing is provided with a cammed recess in the wall of the bore and the indicator sleeve is provided with a passage through the wall thereof which is aligned with the cammed recess in the housing when the sleeve is in the retracted position. The locking means includes a ball bearing, larger in diameter than the length of the passage through the wall of the indicator sleeve. The ball bearing is urged through the passage in the sleeve into the cammed recess in the housing to secure the indicator sleeve in the retracted position by a bearing surface on the actuating rod which extends axially into the sleeve and overlaps the passage in the sleeve when the two points are a first distance apart. When the two points are a second distance apart, the bearing surface on the actuating rod is no longer adjacent the passage in the indicator sleeve and the ball bearing is urged through the passage toward the bore in the indicator sleeve by the cammed recess in the housing as the sleeve is moved to the extended position by the bias means.

Also, preferably, the actuating rod is adjustable in length with provides means for adjusting the device for use with points of varying initial separation and for adjusting the amount of change in the distance which triggers the indicator. This may be provided by threadly telescoping two sections of the rod and providing for rotation of one section by removing a plug in the exposed end of the indicator sleeve and inserting a tool so that the sensitivity of the device may be modified while in place. When slidable seals are provided for the housing, the interior is protected against intrusion of unwanted debris, dust or excess moisture, and free movement of the parts over extended periods of time is assured.

The device may be adapted for opening or closing movements between the two points. In the former case, change in distance pulls the actuating rod out of the indicator sleeve to allow the ball bearing to be urged inward and release the indicator sleeve. In the latter case, the actuating rod is provided with a recess so that when the two points have moved closer by an amount which aligns the recess in the actuating rod with the passage in the sleeve, the ball bearing is urged into this recess to release the indicator sleeve.

BRIEF DESCRIPTION OF THE DRAWINGS

FIG. 1 is a vertical view in section of a movement indicator according to the invention which detects opening movement between two points shown as the parts would appear before the points have separated the preset distance;

FIG. 2 is a vertical section of the indicator of FIG. 1 shown as the parts would appear after the points have separated the preset distance;

DESCRIPTION OF THE PREFERRED EMBODIMENT

Figure 3:
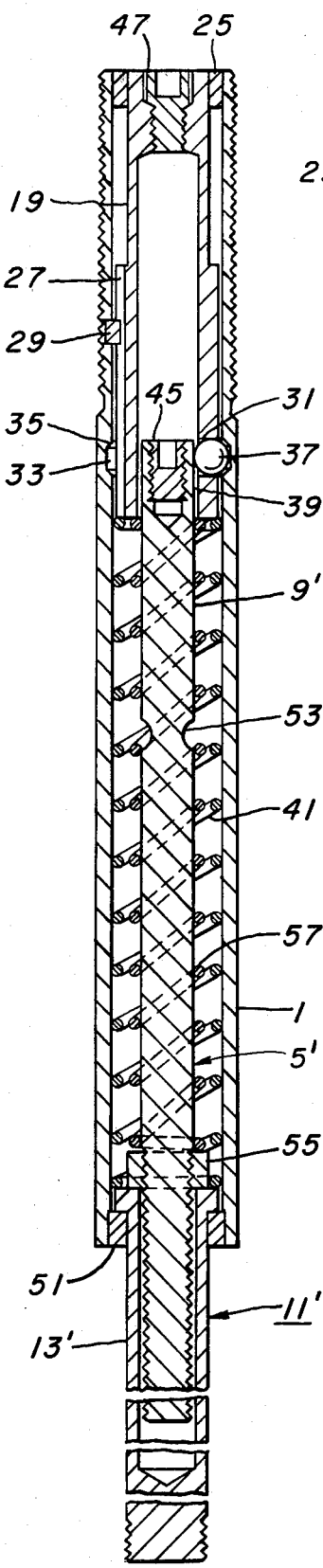
FIG. 3 is a vertical view in section of a movement indicator according to the invention which detects closing movement between two points shown as the parts would appear before the points have closed the preset distance.
Figure 5:
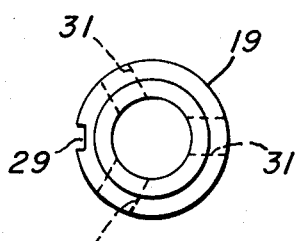
FIG. 5 is a plan view of the indicator sleeve used in detectors illustrated in FIGS. 1 through 4.

The movement indicator of the present invention may be adapted to detect and provide a discrete indication of a predetermined opening or closing movement between two points. The indicator of FIGS. 1 and 2, which is adapted to detect opening movement, includes a cylindrical housing 1 having an axial bore 3 therethrough and is provided with an external thread on one end thereof for securing the housing to one of the points to be monitored. An actuating rod, identified by the general reference character 5, is axially slidable in the bore 3 in the housing and may be provided at the other end with a foot plate 7 which bears against the second point to be monitored. Alternatively, the other end of the actuating rod may be anchored to the second point. The actuating rod 5 comprises two basic sections, an adjusting rod 9 and a follower rod 11. The latter section may be made up of a follower plug 13 and, if required, any number of rods 15 connected end-to-end, as by threaded connections, to span the distance between the initial positions of the first and second points.

The adjusting rod section 9 of the actuating rod 5 is axially slidable into the bore 17 in a cylindrical indicator sleeve 19 which itself is slidable in the bore 3 of the housing 1. The indicator sleeve 19 is slidable within the housing from a retracted position, as seen in FIG. 1 where the outer end 21 thereof is flush with the housing 1, and an extended position, as seen in FIG. 2 wherein the outer end of the sleeve protrudes from the housing a significant distance. A shoulder 23 on the sleeve 19 comes in contact with a seal 25 inserted in the bore 3 of the housing to limit the extension of the indicator sleeve 19. An axially aligned keyway 27 on the periphery of the sleeve cooperates with a pin 29 protruding from the housing 1 into the keyway 27 to prevent rotation of the sleeve.

Three passages 31, spaced equiangularly around the indicator sleeve 19, extend radially through the walls of the sleeve near the inner end thereof. With the sleeve in the retracted position, as shown in FIG. 1, the passages 31 in the sleeve are aligned with an annular groove 33 in the bore 3 of the housing. The groove 33 is provided with beveled edges 35 to form a cammed recess in the housing 1. A ball bearing 37 is carried in each of the passages 31. With the adjusting rod 9 in the position shown in FIG. 1, a bearing surface 39 on the outer surface thereof forces the ball bearings 37, which are larger in diameter than the length of the passage 31, into the annular groove 33 to lock the indicator sleeve in the retracted position.

In the movement indicator shown in FIGS. 1 and 2, the lower end of the adjusting rod 9 is telescopically threaded into the follower plug 13 of the lower section 11 of the actuating rod. A spring 41 bears against the indicator sleeve 19 and a shoulder 43 on the follower plug 13. Since the indicator sleeve 19 is locked against axial movement by the ball bearings 37, the foot plate 7 on the lower end of the actuating rod is urged downward against the second point. As the distance increases between the first point, to which the housing 1 is connected, and the second point, against which the foot plate 7 bears, the actuating rod 5 is urged downward as seen in FIGS. 1 and 2. When the actuating rod has been thus extended to the point where the upper end of the adjusting rod 9 is below the passages 31 in the indicator sleeve 19, the force of the spring 41 acting upward on the indicator sleeve 19 urges the ball bearings 37, under the camming action of the beveled edges 35, out of the annular groove 33 and through the passage 31 into the bore 17 in the indicator sleeve. The passages 31 are counterbored such that the ball bearings do not fall into the bore 17 but they are fully retracted from the cammed recess formed by the groove 33, whereupon the spring 41 drives the indicator sleeve to the extended position. The extension of the indicator sleeve 19 provides a discrete, easily observable indication that the two points have separated the preset distance determined by the length of the actuating rod which extends above the passages 31 in the initial position.

In order to adjust the movement required to activate the discrete indication, a plug 45 threaded into the end of adjusting rod 9 is provided with an Allen head socket. With plug 47 removed from the end of indicator sleeve 19, an Allen wrench may be inserted into the Allen head socket to rotate the adjusting rod and thereby telescopically thread the adjusting rod into or out of the follower plug 13 to set the sensitivity of the indicator. A set screw 49 threaded into the bottom of the adjusting rod precludes inadvertent disconnection of the adjusting rod from the follower plug.

In addition to providing a discrete indication of a preset amount of movement between the two points, the actual movement can be continually monitored. By removing the plug 47 from the indicator sleeve 19, a gauge may be inserted into the sleeve and the movement can be measured as the change since the previous reading in the distance between the top of the adjusting rod 9 and the top of the indication sleeve 19 or the housing 1.

As another feature of the device, another sliding seal 51 may be provided between the bottom of the housing 1 and the follower plug 13 to form a closed chamber which will minimize entry of debris, dust and excess moisture which would affect the free movement between the internal parts. This is useful where there may be no movement for years.

Figure 4:
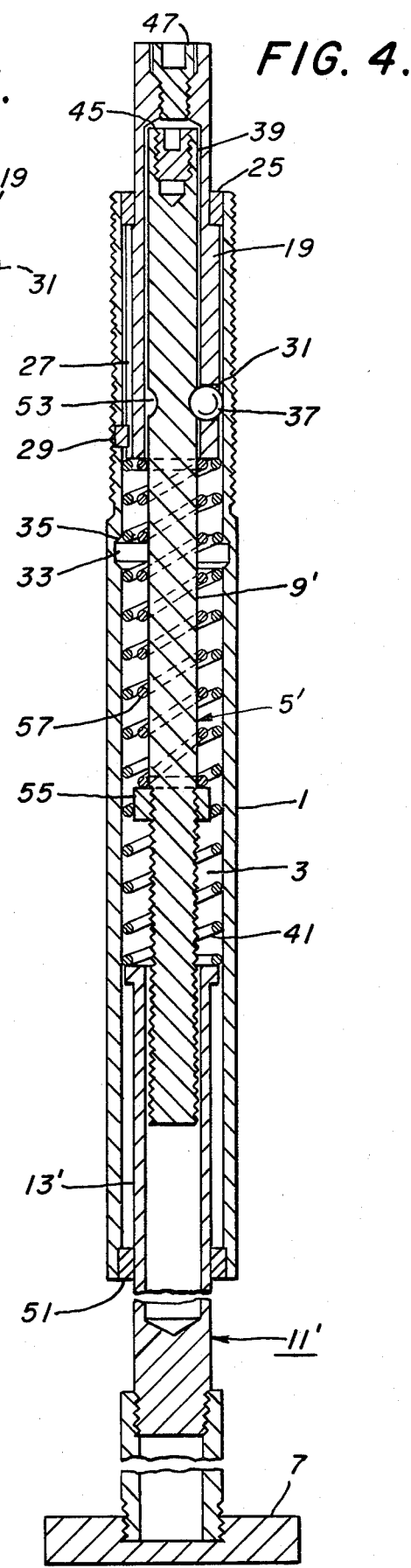
FIG. 4 is a vertical section of the movement indicator of FIG. 3 shown as the parts would appear after the points have closed the preset distance.

FIGS. 3 and 4 illustrate a movement indicator according to the invention and adapted for providing a discrete indication of closing movement between two points. Most of the parts are identical to the corresponding parts in the indicator illustrated in FIGS. 1 and 2 and have therefore been given identical reference characters. Where the parts are similar but not identical, they have been given corresponding primed reference characters. The important difference between the two indicators lies in the construction of the actuating rod 5'. In the closing movement indicator, the adjusting rod section 9' of the actuating rod is provided with an annular groove 53 girdling the rod between the bearing surface 39 and the threaded end. In addition, the follower plug 13' of the second section 11' of the actuating rod is not provided with an internal thread for threaded engagement with the adjusting rod. Instead, the threaded end of the adjusting rod is freely slidable in telescoping fashion in and out of the follower plug 13'.

Two additional parts are provided in the closing movement indicator. An adjustment nut 55 is threaded onto the adjusting rod 9' and a second spring 57 bears against the adjustment nut 55 and the end of the indicator plug 19.

As in the case of the opening movement indicator, the housing of the closing movement indicator is secured to the first point to be monitored and the foot plate 7 bears against or is anchored to the second. Initially, the parts of the closing movement indicator are situated as shown in FIG. 3. The indicator sleeve 19 is locked in the retracted position by the bearing surface 39 on the actuating rod 9' which forces the ball bearings 37 through the passages 31 in the sleeve into the cammed recess in the housing 1 formed by the bevel edged annular groove 33. As the two points converge, the lower section 11' of the actuating rod 5' is kept in contact with the second point by the spring 41. As the follower plug 13' is forced upward in the housing 1 by the converging movement of the two points, it bears against the adjustment nut 55 which is maintained in abutment with the follower plug 13' by the spring 57. Raising of the adjustment nut 55 lifts the adjusting rod 9' relative to the indicator sleeve 19 which remains locked in the retracted position. When the two points have closed on each other the preset amount, the annular groove 53 on the adjusting rod 9' will become aligned with the passages 31 in the indicator sleeve 19. At this point, the force exerted by the springs 41 and 57 urges the sleeve 19 upward as shown in FIGS. 3 and 4, which in turn urges the ball bearings 37 through the passages 31 into the recess 53 in the adjusting rod 9' through the camming action produced by the bevel edged annular groove 33 in the housing. The indicator sleeve 19 is thereby unlocked and is driven to the extended position by the spring 41. The adjusting rod 9' is carried with the indicator sleeve 19 as the sleeve travels to the extended position.

As in the case of the opening movement indicator, the amount of closing movement which triggers the discrete movement indication can be set by removing the plug 47 from the indicator sleeve 19 and inserting an Allen wrench into the Allen head socket in the plug 45 in the adjusting rod. The adjustment nut 55 is keyed (not shown) with the follower plug such that rotation of the adjusting rod varies the effective length of the actuating rod and therefore the amount of movement required to produce the discrete indication.

Likewise, the actual amount of closing movement between the two points can be accurately monitored by inserting a gauge into the indicator sleeve 19 and measuring the change in the distance between the top of the adjusting rod 9' and the top of the sleeve. In addition, the closing movement indicator can be sealed to prevent entrance of debris, dust and excess moisture and thereby preserve the freedom of movement of the parts.

Figure 6A:
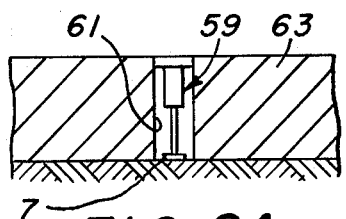
FIGS. 6a and b are schematic diagrams illustrating use of the invention in detecting settlement under a portion of a spanning type foundation.
Figure 6B:
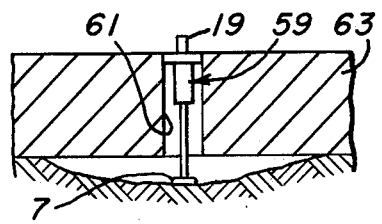

As can be appreciated, both the opening and closing movement indicators may be used in any orientation and in many applications in the engineering, construction and mining fields. For instance, as illustrated in FIGS. 6a and b, the opening movement type indicator can be used in subsidence prone or karst topography areas to monitor movements beneath spanning type foundations. As illustrated in FIG. 6a, an indicator 59 of the type depicted in FIGS. 1 and 2 is installed in a bore 61 in the foundation 63 with the foot pad 7 bearing against the soil or rock below. When the soil or rock has subsided the preset amount, the indicator sleeve 19 pops up as shown in FIG. 6b to indicate that settlement has exceeded the permissible amount. If desired, the indicator may be removed and the void filled with grout. The indicator can then be reinstalled to monitor subsequent settlement. Preferably, the sleeve 19 is painted with a bright, high visibility paint or made of bright, high visibility colored material so that extended plugs may be observed at a glance. A number of indicators may be placed at strategic points in the foundation to provide full coverage.

Figure 7A:
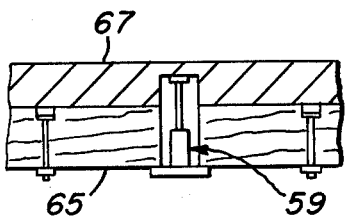
FIGS. 7a and b are schematic diagrams illustrating use of the invention in detecting sag in a mine roof.
Figure 7B:
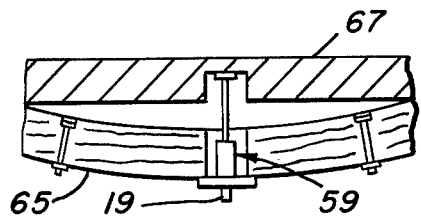
Figure 8:
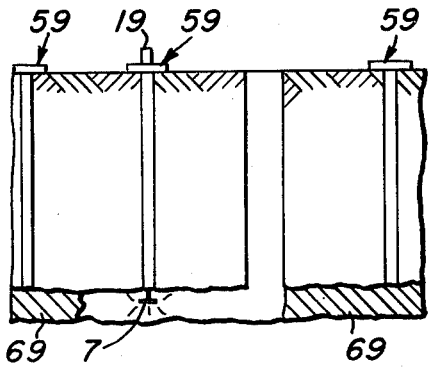
FIG. 8 is a schematic diagram illustrating the use of the invention in providing surface indications of underground mining, excavation or tunneling operations.

As illustrated in FIGS. 7a and b, the opening type indicator 59 can also be used to detect the sagging of beams or bolted rock zones 65 supporting the roof 67 of a mine or tunnel. Movements of unbolted mine roof rock or rock in side walls can also be measured. A bore is placed beyond the zone of influence or area of probable movement. The foot pad bears against the bottom of the base and the housing is fastened to the rock at the opening into the mine or tunnel. In another mine application, a plurality of indicators 59 located at the surface with the foot pads bearing against the seam 69 to be mined may be used to assess zones of mining as illustrated in FIG. 8.

Figure 9:
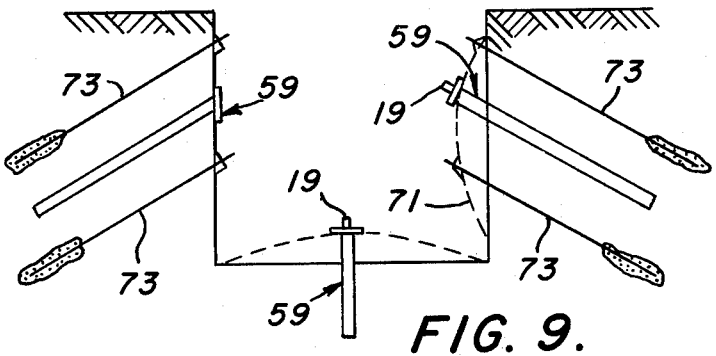
FIG. 9 is a schematic diagram illustrating use of the invention in monitoring for wall slides during excavations.
Figure 10:
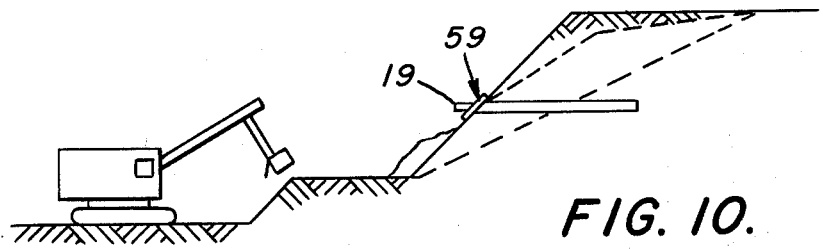
FIG. 10 is a schematic diagram illustrating use of the invention in detecting heaves in deep excavations.

FIG. 9 discloses use of the opening type movement indicators 59 in detecting heaving in deep excavations and underground work. In this application, the indicator trips when bulging of the shoring 71, which is secured by tie rods 73 anchored in the rock or earth formation, exceeds the preset amount. FIG. 10 illustrates the use of an opening type movement indicator 59 to detect potential slides in pit wall areas. This type of application illustrates the advantage of the ease of adjustment of the preset movement in the present invention since only very small movements in hard rock are an indication of a potential slide while movements of 1 to 2 inches in softer material, such as shale, would be acceptable.

Figure 11A:
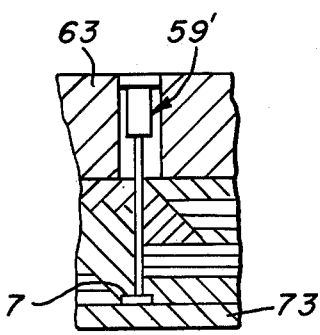
FIGS. 11a and b are schematic diagrams illustrating use of the invention in detecting settlement of foundations.
Figure 11B:
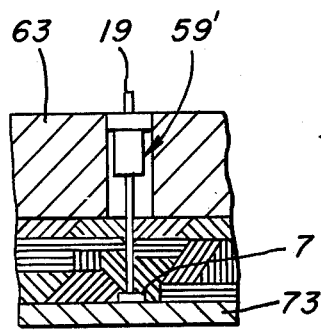

FIGS. 11a and b illustrate the use of the closing movement type indicator 59' of the type depicted in FIGS. 3 and 4 to detect settlement of a foundation. In this application, the foot pad of the actuating rod is placed against bed rock 73 or otherwise below the zone of influence of the foundation. When the foundation has settled a preselected amount, the indicator sleeve pops up as shown in FIG. 11b. Several closing type movement indicators 59' with actuating rods of different lengths can be employed as in FIG. 11 to detect settlement at various levels below the foundation.

Figure 12:
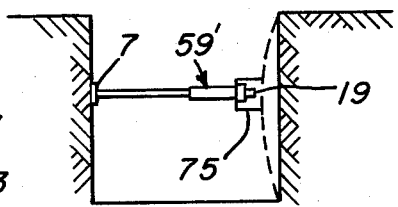
FIG. 12 is a schematic diagram illustrating use of the invention in detecting side wall movements in trenches or tunnels.

Another application for the closing type movement indicator is illustrated in FIG. 12 where the device is wedged between the walls of a trench or other underground excavation. A yoke 75 displaces the housing from the adjacent wall so that should the walls converge by the preset amount, the indicator sleeve will be extended as shown in this figure.

We claim:

1. A device for detecting a predetermined discrete movement between first and second displaced points comprising:
    a housing having a cylindrical bore therethrough and secured to one point;
    an elongated slidable actuating rod having a first end bearing against the second point and a second end of said actuating rod slidably inserted into a first end of the cylindrical bore in said housing;
    a cylindrical indicator sleeve inserted into a second end of the cylindrical bore in said housing and axially slidable between a retracted position within the housing and an extended position wherein a portion of said sleeve extends beyond the second end of the cylindrical bore in said housing;
    means biasing the indicator sleeve to the extended position; and
    locking means operated by said actuating rod securing said indicator sleeve in the retracted position until the actuating rod moves a predetermined distance inside the housing in response to a corresponding change in the distance between the first and second points to release the indicator sleeve and permit the biasing means to urge said sleeve to the extended position thus presenting a discrete, mechanical indication of said predetermined change in distance between the first and second points.

2. The device of claim 1 wherein said housing is provided with a cammed recess in the wall of said axial bore and wherein said indicator sleeve is provided with a passage through the wall thereof which is adjacent the recess in the bore of the housing when said sleeve is in the retracted position, and
    wherein said locking means includes a ball bearing larger in diameter than the length of the passage through the wall of the indicator sleeve which is urged through the passage in the sleeve into the cammed recess to secure the indicator sleeve in the retracted position by a bearing surface on the actuating rod which extends axially into said indicator sleeve and overlaps said passage when said first and second points are a first distance apart, and which ball bearing is urged from the recess in the bore of the housing by the camming action of the recess to release the indicator sleeve when the first and second points are a second distance apart at which the bearing surface of the actuating rod is no longer adjacent the passage through the wall of the indicator sleeve and the sleeve is moved to the extended position under the urging of the bias means.

3. The device of claim 2 wherein said actuator rod comprises two sections adjustably connected to one another to allow for adjustment of the overall length of the actuating rod whereby the device can be adjusted for varying initial distances between the first and second points and for operating the locking means for varying selected relative movements between the first and second points.

4. The device of claim 3 wherein said two sections are threadly telescopically disposed and the free end of the first section of the actuating rod which extends into said indicator sleeve can be rotated by an insertable tool whereby the effective length of the actuating rod may be adjusted by a tool inserted through the cylindrical indicator sleeve.

5. The device of claim 4 including a removable plug inserted in the exposed end of said cylindrical indicator sleeve, said plug being removable for insertion of a tool into the sleeve to engage the free end of said first section of the actuating rod to adjust the length thereof.

6. The device of claim 5 wherein the second section of the actuating rod is a cylindrical tube sealed at the free end which receives the first section in the bore thereof and which itself is slidable in the bore of said housing, and wherein a slidable seal is provided between the housing and the second section of the actuating rod and between the housing and the cylindrical indicator sleeve whereby a sealed chamber is formed within the housing which minimizes the entrance of debris, dust or excess moisture and permits free movement of the actuating rod, the indicator sleeve and the ball bearing over extended periods of time.

7. The device of claim 2 wherein said bias means comprises a compression spring inserted in the bore of said housing and bearing against said indicator sleeve.

8. The device of claim 7 adapted for indicating a preset amount of opening movement between said first and second points wherein the length of the actuating rod is adjusted such that the end of the actuating rod extending into the indicator sleeve is pulled past the passage through the indicator sleeve to permit the bias means to move the indicator sleeve to the extended position as the ball bearing is displaced from the cammed recess toward the bore in the indicator sleeve by the camming action of the recess when the distance between the first and second objects has increased the preset amount.

9. The device of claim 7 adapted for indicating a preset amount of closing movement between said first and second points wherein the actuating rod is provided with a recess adjacent the bearing surface thereon which becomes aligned with the passage in the indicator sleeve to permit the bias means to move the sleeve to the extended position as the ball bearing is displaced from the cammed recess in the housing through the passage in the sleeve toward the recess in the actuating rod by the camming action of the recess in the housing when the actuating rod has been pushed into the indicator sleeve by the preset closing movement between said first and second points.

10. The device of claim 9 wherein the actuating rod comprises two sections the first of which is a rod with a first end carrying the bearing surface and the recess slidable in the indicator sleeve and the other end telescopically disposed in the second section, an adjustment nut axially displaceable along the first section adjacent the second end thereof and second biasing means for biasing the adjustment nut against the second section of the actuating rod.

* * * * *